(12) United States Patent
Ryu et al.

(10) Patent No.: US 7,855,028 B2
(45) Date of Patent: Dec. 21, 2010

(54) SEPARATOR PLATE FOR MOLTEN CARBONATE FUEL CELL

(75) Inventors: Bo-Hyun Ryu, Daejeon (KR); Boo-Ho Yoon, Daejeon (KR); Dong-Woo Kang, Daejeon (KR); Kil-Ho Moon, Daejeon (KR); In-Gab Chang, Daejeon (KR); Gi-Pung Lee, Daejeon (KR); Yun-Sung Kim, Daejeon (KR)

(73) Assignee: Doosan Heavy Industries & Construction Co., Ltd. (KR)

( * ) Notice: Subject to any disclaimer, the term of this patent is extended or adjusted under 35 U.S.C. 154(b) by 855 days.

(21) Appl. No.: 11/673,158

(22) Filed: Feb. 9, 2007

(65) Prior Publication Data

US 2007/0190395 A1    Aug. 16, 2007

(30) Foreign Application Priority Data

Feb. 10, 2006    (KR) ............... 10-2006-0013152

(51) Int. Cl.
*H01M 2/14* (2006.01)
*H01M 8/02* (2006.01)
*H01M 8/24* (2006.01)

(52) U.S. Cl. .............. 429/457; 429/464; 429/472
(58) Field of Classification Search .......... 429/457, 429/464, 472
See application file for complete search history.

(56) References Cited

U.S. PATENT DOCUMENTS 4,604,331 A * 8/1986 Louis ................ 429/35
4,997,727 A * 3/1991 Bossel .............. 429/33

FOREIGN PATENT DOCUMENTS

KR    100259213    6/2000

* cited by examiner

*Primary Examiner*—Patrick Ryan
*Assistant Examiner*—Karie O'Neill Apicella
(74) *Attorney, Agent, or Firm*—Cantor Colburn LLP

(57) ABSTRACT

Disclosed is a separator plate for a molten carbonate fuel cell, which functions to reform a fuel gas while allowing it to efficiently flow therein and thereout, thus producing hydrogen and carbon dioxide, which are then supplied into an anode, and which functions to realize the electrical connection between the anode and the cathode. In the center plate, having a central portion and peripheral portions of the separator plate, the central portion has gas flow paths, that is, guide protrusions and guide grooves, and the peripheral portions are formed into sidewall parts through a folding process, and thus the number of constituents of the separator plate is minimized, thereby reducing the area to be welded. Further, the sidewall parts are integrally structured with the center plate, thereby increasing airtightness and solving problems of corrosion which may be caused in the welded area.

11 Claims, 6 Drawing Sheets

SEPARATOR PLATE FOR MOLTEN CARBONATE FUEL CELL

This application claims the benefit of the filing date of Korean Patent Application No. 10-2006-0013152, filed on Feb. 10, 2006, in the Korean intellectual Property Office, the disclosure of which is incorporated herein its entirety by reference.

BACKGROUND OF THE INVENTION

1. Field of the Invention

The present invention relates, generally, to a separator plate for a molten carbonate fuel cell and a manufacturing method thereof. More particularly, the present invention relates to a separator plate for use in a molten carbonate fuel cell, which functions to reform a fuel gas while allowing it to efficiently flow therein and thereout, thus producing hydrogen and carbon dioxide, which are then supplied into an anode, and which functions to realize the electrical connection between the anode and the cathode, and to a method of simply manufacturing the same.

2. Description of the Related Art

Fuel cells are receiving attention as a next-generation generator having high efficiency and generating little pollution for converting chemical energy into electrical energy through the oxidation-reduction reaction of reactants.

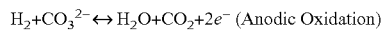  (Anodic Oxidation)

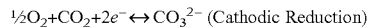  (Cathodic Reduction)

The fuel cell is essentially composed of an anode, a cathode, and an electrolyte matrix positioned between the anode and the cathode, in which an electrolyte is incorporated in the electrolyte matrix to assure efficient ion flow. That is, a fuel gas is supplied into the anode to thus oxidize it, whereas oxygen or air is supplied into the cathode along with carbon dioxide to generate carbonate ions ($CO_3^{2-}$), which are then transferred to the anode from the cathode through the electrolyte matrix positioned between the anode and the cathode. As such, electrons flow via an external circuit. Thus, in the fuel cell, the chemical energy is directly converted into electrical energy through the oxidation-reduction reaction of hydrogen and oxygen. Accordingly, the fuel cell is advantageous in that it has high efficiency (since there is no limitation like that of a Carnot cycle, which is characterized by low generation efficiency when mechanically generating heat by heating water or other media and rotating a turbine using steam pressure, as in typical heat generation), generates little pollution (since nitrogen oxide or sulfur oxide are not discharged), produces no noise (since there are no driving parts), can be made modular (since the fuel cell is easy to construct and enlarge and the capacity thereof may be variously formed), is compatible with a variety of fuels (since it is possible to use fuels such as hydrogen, coal gas, natural gas, methanol, and gasoline), and enables cogeneration (since warm water may be produced using waste heat in a high-temperature fuel cell).

In particular, called a second generation fuel cell, a molten carbonate fuel cell (hereinafter, referred to as an "MCFC") is characterized in that material, in which carbonate of alkali metal such as lithium carbonate or potassium carbonate is melted, is used as an electrolyte, and sintered nickel and sintered lithiated nickel oxide are used as an anode and a cathode, respectively. That is, a fast electrochemical reaction at high temperatures enables the use of inexpensive nickel, instead of platinum, as electrode material, thus generating economic benefits. Further, thanks to the properties of the nickel electrode in which even carbon monoxide, which negatively affects the platinum electrode, may be used as fuel through a water gas shift reaction, various fuels, such as coal gas, natural gas, methanol, and biomass, may be selected. When good quality high-temperature waste heat is recovered using a heat recovery steam generator (HRSG), the total heat efficiency of the generation system may be increased to about 60% or higher. Furthermore, since the MCFC is operated at high temperatures, an electrochemical reaction and a fuel reforming reaction may simultaneously take place in a fuel cell stack to thus realize internal reforming. Such an internal reforming MCFC functions to directly apply the heat value of the electrochemical reaction to a reforming reaction, which is an endothermic reaction, even without the use of an additional external heat exchanger, and therefore the total heat efficiency of the system is much higher than that of an external reforming MCFC, and furthermore, the structure of the system is simplified. The MCFC is composed largely of a stack for producing electricity, a mechanical peripheral device, such as a fuel supplier, and an electrical peripheral device, such as an electrical converter. In particular, since the stack affects the generation efficiency, lifetime, and performance of the MCFC, thorough research into shapes of separator plates constituting the stack and methods of supplying fuel into the separator plate has been conducted.

Despite such advantages of the MCFC, it is disadvantageous because it must be operated at high temperatures and uses highly corrosive molten carbonate as an electrolyte, undesirably leading to easy corrosion of the constituents of the cell. In particular, the separator plate should be provided with a cathode part, an anode part, and an electrolyte matrix therebetween, and a fuel gas and an oxidizing gas should separately flow in the separator plate, and thus the corrosion of the separator plate or the leakage from the separator plate very negatively affect the overall performance of the fuel cell. In addition, the separator plate of the MCFC should function to reform a fuel gas, such as natural gas or coal gas, which is continuously supplied, into hydrogen.

A conventional separator plate for an MCFC stack (Korean Examined Patent Publication No. 10-0259213) comprises an anode manifold for transferring hydrogen and carbon dioxide, reformed from a fuel gas using a reformer, as a fuel converter among peripheral devices, to the separator plate, and a cathode manifold for transferring air and carbon dioxide, the anode manifold and the cathode manifold being sequentially disposed on the same surface of the separator plate. In addition, in order to maintain gas tightness, the separator plate has a structure in which the electrolyte matrix between the ends of the manifolds has a wet seal area for preventing the supplied gases from mixing, and the gases are transferred to the anode and the cathode via a shielded slot type current collector plate, ultimately causing an electrochemical reaction. The current is produced by the oxidation-reduction generated from the anode and the cathode, and thus flows along the separator plate. In the separator plate having such a structure, it is very important that the mixing of gases respectively distributed to the anode and the cathode be prevented in order to realize gas tightness. Hence, a welding process is performed a greater number of times, and thereby the form of the separator plate is complicated, undesirably increasing the manufacturing cost. Even though heat treatment is conducted, since the distortion of the separator plate is not completely solved, upon stack lamination, uniform stress distribution and an airtight wet seal area cannot be realized. Moreover, using the reformer, which is an external peripheral device, the fuel gas is reformed to supply hydrogen, and therefore it is impossible to control the temperature distribution that forms in the gas supplied into the stack.

In a conventional separator plate, with the goal of completely separating the gas of the anode part from that of the cathode part, the end of the separator plate and the gas inlet of the manifold are welded using an Nd-YAG laser, and the wet seal area is subjected to corrosion resistant coating using a mixture comprising aluminum, as a main ingredient, nickel, titanium, chromium, and copper, or using a ceramic material such as titanium nitride, and is then allowed to stand at 500~600° C. for a predetermined time period in a reduction atmosphere or in a vacuum furnace, followed by performing heat treatment for forming an aluminum diffusion layer at an increased temperature of 700~850° C.

Since a hot-dip process, which is a conventional coating process, is difficult to use to mask an undesired portion and must be performed at high temperatures, the deformation of base metal undesirably occurs after using an aluminum melt. In addition, although a physical vapor deposition process enables the formation of a high quality coating layer, it suffers because the thickness of the layer is difficult to increase and the preparation cost thereof is very high. In addition, a pack cementation process may cause problems related to the deformation of a separator plate and the phase change of a base metal when work is conducted at 1000° C. or higher. Further, in the case of a thermal spray process, due to blasting for pretreatment or the pressure of a gun, a base metal may be deformed or pores may remain therein, and the thickness of the layer may be non-uniform. Furthermore, a slurry coating process is inexpensive and is easy to use to coat various shapes, but it is difficult to maintain the viscosity of the slurry, and thus the thickness uniformity is decreased, and also pores, resulting from solvent evaporation, are difficult to eliminate, and thereby the thickness of the coating layer is limited.

Accordingly, the present invention proposes a separator plate which is different from a conventional separator plate for an MCFC, and specifically a direct internal reforming (DIR) MCFC, which can be manufactured through a simple process and has a long stack lifetime, and to which a screen printing coating process is applied.

SUMMARY OF THE INVENTION

Accordingly, the present invention has been made keeping in mind the above problems occurring in the related art, and an object of the present invention is to provide a separator plate, which functions to reform a fuel gas while allowing it to efficiently flow therein and thereout and also functions to realize the electrical connection between an anode and a cathode, and a method of simply manufacturing such a separator plate.

In order to accomplish the above object, the present invention provides separator plate for an MCFC, comprising a center plate composed of a corrosion resistant metal plate, which includes a channel part formed by processing the central portion of the center plate to form a corrugated structure having guide protrusions and guide grooves on both surfaces thereof; a first sidewall part and a second sidewall part, each of which is integrated with the center plate in such a manner that a first peripheral portion and a second peripheral portion, which are positioned at edges of the channel part, are integrated with the center plate and are opposite each other, are folded upwards in a shape of a rectangular bar having one surface open toward the central portion of the center plate; and a third sidewall part and a fourth sidewall part, each of which is integrated with the center plate in such a manner that a third peripheral portion and a fourth peripheral portion, integrated with the center plate and opposite each other are folded downwards, wherein a first end plate is attached to, among both ends of each of the first sidewall part and the second sidewall part, ends thereof on the fourth sidewall part, a fifth sidewall part is mounted to the margin of the center plate on the third sidewall part so as to be disposed between the first sidewall part and the second sidewall part so that, among both ends of each of the first sidewall part and the second sidewall part, ends thereof on the third sidewall part are open, a second seal plate and a third seal plate are attached to both open ends of the third sidewall part, and a fourth seal plate and a fifth seal plate are attached to both open ends of the fourth sidewall part.

The guide protrusions and the guide grooves may be formed in a continuously corrugated structure to thus distribute gas flow paths over the entire area of the separator plate.

In addition, the present invention provides a method of manufacturing a separator plate for an MCFC, comprising (1) a preparation step of cutting a center plate to form a central portion and four peripheral portions therearound; (2) a channel formation step of forming guide protrusions and guide grooves on the central portion of the center plate; (3) a coating step of subjecting the central portion having the channels to nickel coating and the peripheral portions to corrosion resistant coating; and (4) a shaping step of folding the peripheral portions to thus form sidewall parts.

DESCRIPTION OF THE PREFERRED EMBODIMENTS

Hereinafter, a detailed description will be given of the embodiments of the present invention with reference to the appended drawings.

Figure 1:
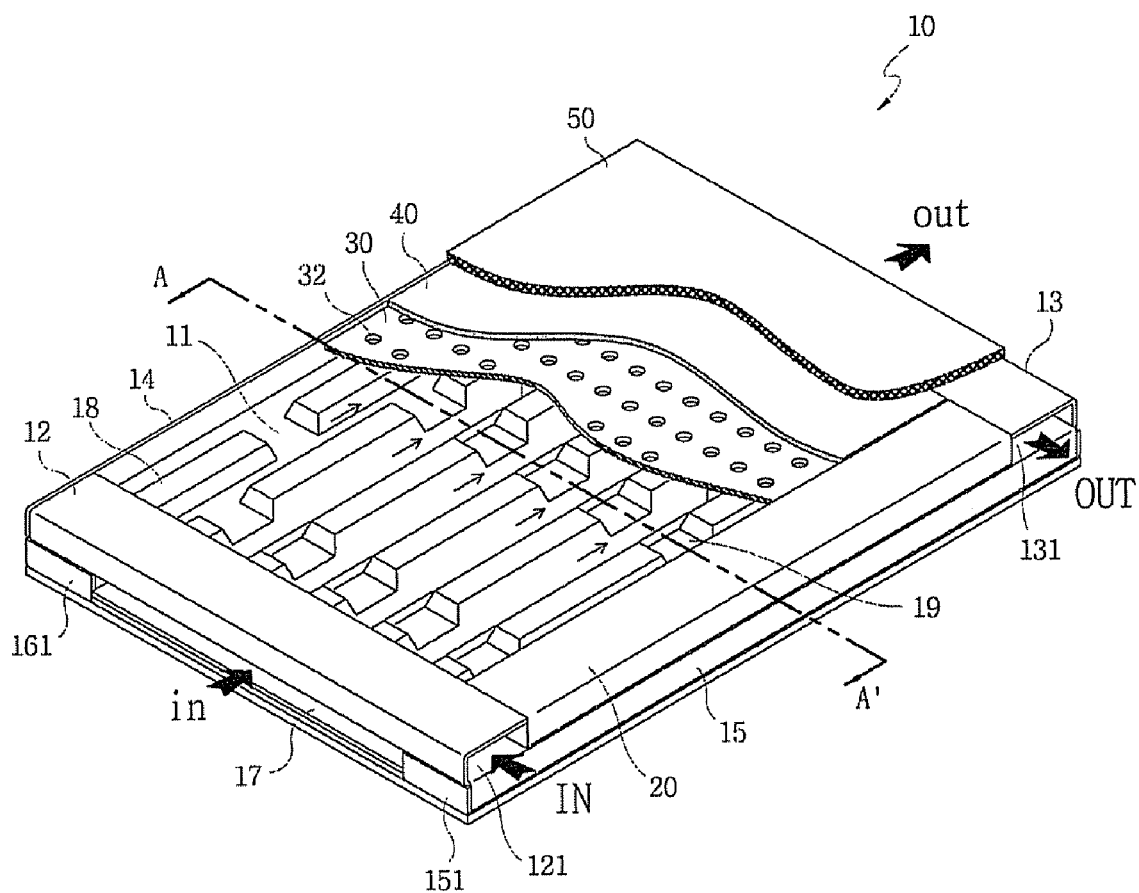
FIG. 1 is a schematic perspective view illustrating the structure of a unit cell plate including the separator plate for an MCFC according to the present invention.

As illustrated in FIG. 1, the separator plate for an MCFC according to the present invention comprises a center plate composed of a corrosion resistant metal plate. The separator plate of the present invention comprises a channel part formed by processing the central portion of the center plate 11 to form a corrugated structure having guide protrusions 18 and guide grooves 19 on both surfaces thereof, and a first sidewall part 12 and a second sidewall part 13, each of which is integrated with the center plate 11 in such a manner that a first peripheral portion 12A and a second peripheral portion 13A, which are positioned at both edges of the channel part, are integrated with the center plate 11 and are opposite each other, are folded upwards in the shape of a rectangular bar having one surface open toward the central portion of the center plate 11. Further, a third sidewall part 15 and a fourth sidewall part 16 are included, each of which is integrated with the center plate 11 in such a manner that a third peripheral portion 15A and a fourth peripheral portion 16A, integrated with the center plate 11 and opposite each other, are folded downwards. In addition, the separator plate of the present invention further includes a first end plate 14 attached to, among both ends of each of the first sidewall part 12 and the second sidewall part 13, the ends thereof on the fourth sidewall part 16, and a fifth sidewall part 20 mounted to the margin of the center plate 11 on the third sidewall part 15 to be disposed between the first sidewall part 12 and the second sidewall part 13 so that, among both ends of each of the first sidewall part 12 and the second sidewall part 13, the ends thereof on the third sidewall part 15 are open. Also, a second seal plate 151 and a third seal plate 152 attached to the open ends of the third sidewall part 15 are included, along with a fourth seal plate 161 and a fifth seal plate 162 attached to the open ends of the fourth sidewall part 16.

That is, in the separator plate of the present invention, the center plate 11 consists of a central portion and peripheral portions. The central portion has gas flow paths, that is, guide protrusions 18 and guide grooves 19, and the peripheral portions are formed into sidewall parts through a folding process, and thus the number of constituents of the separator plate is minimized, thereby reducing the area to be welded. Further, in the present invention, the sidewall parts are structured in a manner that is integrated with the center plate, thereby increasing airtightness and solving problems of corrosion which may be caused in the welded area.

Figure 2:
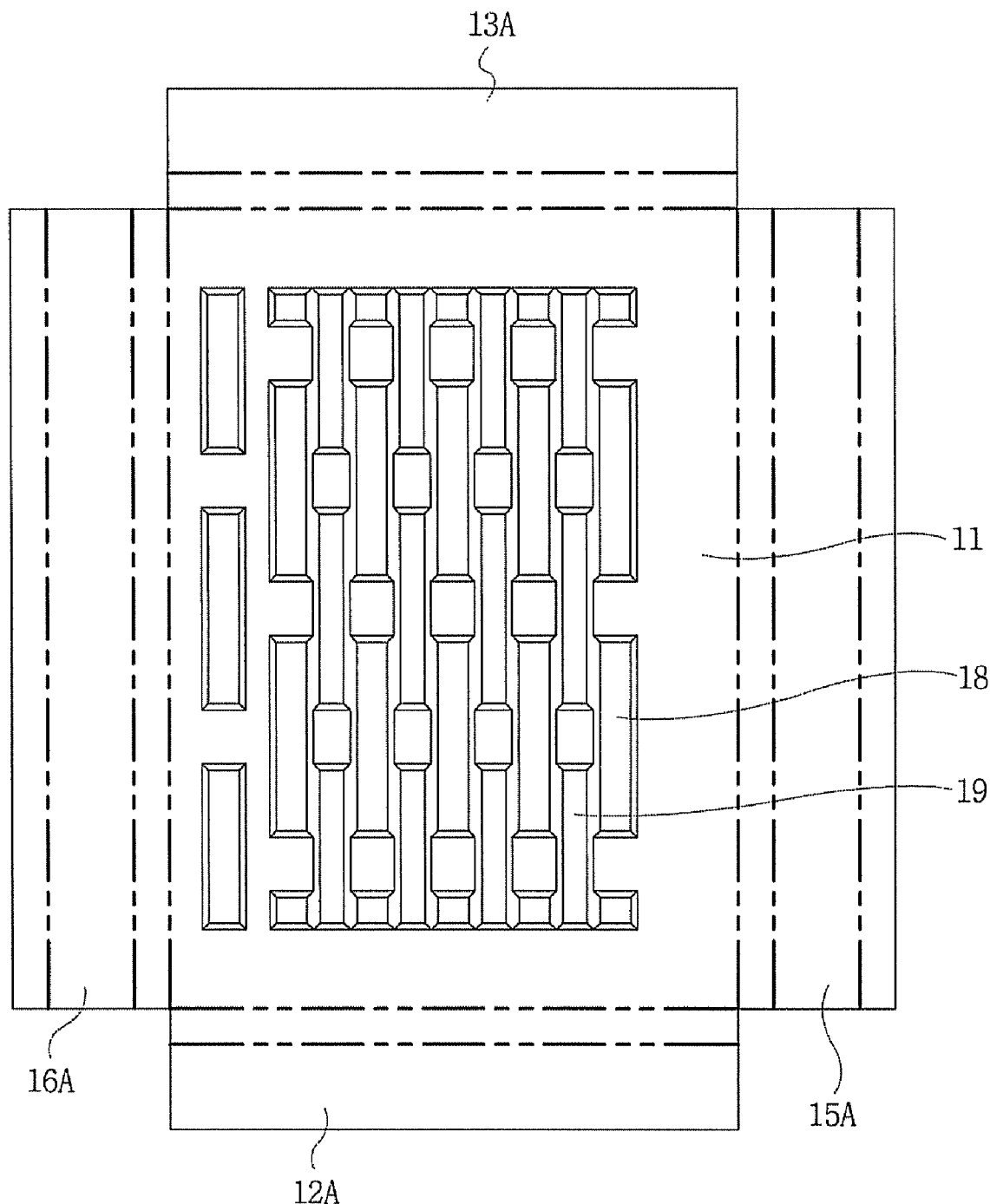
FIG. 2 is a plan view illustrating the development state of the center plate for use in manufacturing the separator plate of FIG. 1, before it is folded.

The metal plate, formed of corrosion resistant material such as stainless steel, is cut as illustrated in FIG. 2. The central portion thereof is processed into a corrugated structure having the guide protrusions 18 and the guide grooves 19 on both surfaces thereof, thus forming the channel part. The guide protrusions 18 and the guide grooves 19 may be formed in the shape of a continuously corrugated structure. Referring to FIG. 1, when seen from the anode part corresponding to the upper surface of the plate, the guide protrusions 18 and the guide grooves 19 have an inverse and corresponding relationship with those seen from the lower surface thereof. These guide protrusions and guide grooves may be easily formed using a typical press, which will be obviously understood by those skilled in the art. The central portion of the metal plate constituting the center plate 11, that is, the channel part, is preferably subjected to nickel coating in order to increase corrosion resistance. As such, the nickel coating process is performed by applying nickel on the channel part in order to increase the corrosion resistance thereof, and may be carried out using a typical electroplating process.

Figure 5:
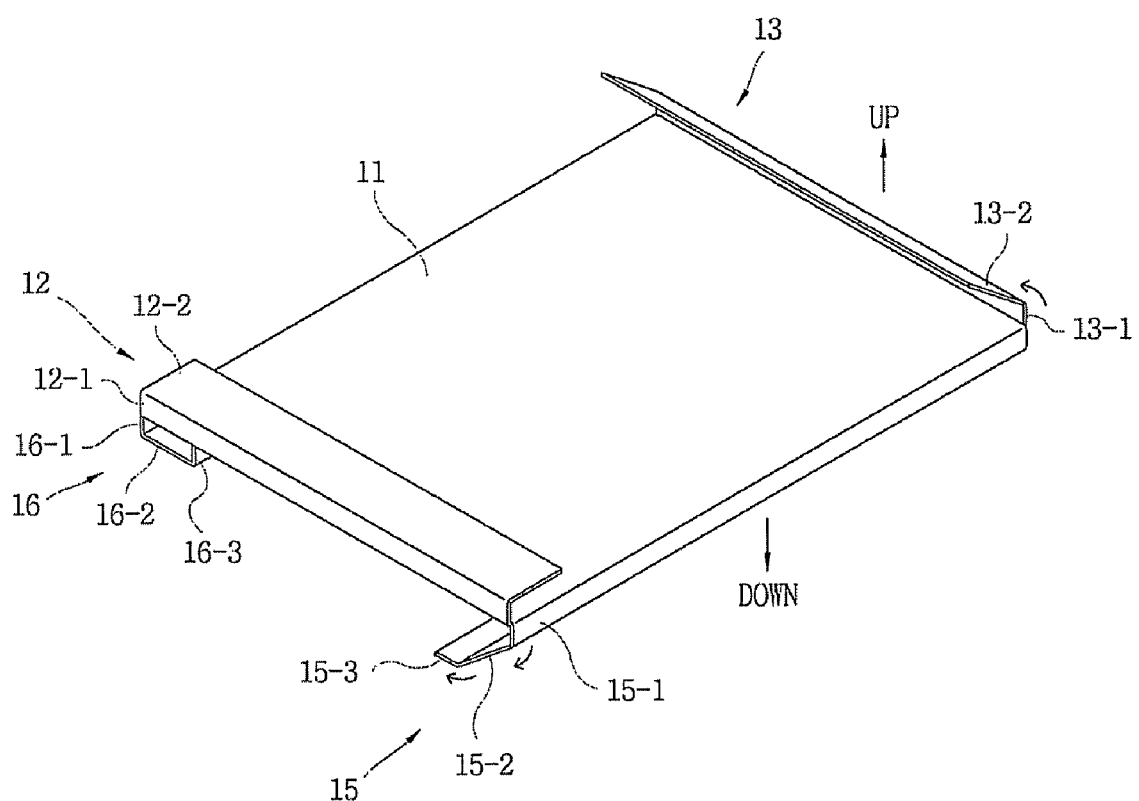
FIG. 5 is a perspective view illustrating the process of folding the central plate of FIG. 2.

As illustrated in FIG. 2, the first peripheral portion 12A, the second peripheral portion 13A, the third peripheral portion 15A, and the fourth peripheral portion 16A, corresponding to four peripheral portions positioned at the edges of the channel part, are folded as seen in FIG. 5 to thus respectively form the first sidewall part 12, the second sidewall part 13, the third sidewall part 15 and the fourth sidewall part 16. The first peripheral portion 12A and the second peripheral portion 13A, which are opposite each other, have two folding lines and thus are folded two times. Consequently, each of the first sidewall part 12 and the second sidewall part 13 is formed in the shape of a square pillar having one open surface. That is, as seen in FIG. 5, the first sidewall part 12 and the second sidewall part 13 are formed by folding the first peripheral portion 12A and the second peripheral portion 13A upwards (represented by "UP"). Illustratively describing the second peripheral portion 13A, a first surface 13-1 of the second peripheral portion 13A is folded at 90° with respect to the center plate 11, and a second surface 13-2 is also folded at 90° with respect to the first surface 13-1, thereby forming the second sidewall part 13 in the shape of the rectangular bar, one surface of which is open toward the central portion of the center plate 11. Also, the first peripheral portion 12A, which includes a first surface 12-1 and a second surface 12-2, is folded like the second peripheral portion 13A. As such, the open portion of the first sidewall part 12 is opposite the open portion of the second sidewall part 13.

In addition, as seen in FIG. 5, the third sidewall part 15 and the fourth sidewall part 16 are formed by folding the third peripheral portion 15A and the fourth peripheral portion 16A downwards (represented by "DOWN"). Illustratively describing the third peripheral portion 15A, a first surface 15-1 of the third peripheral portion 15A is folded at 90° with respect to the center plate 11, a second surface 15-2 is folded at 90° with respect to the first surface 15-1, and also a third surface 15-3 is folded at 90° with respect to the second surface 15-2, thereby forming the third sidewall part 15 in the shape of a rectangular bar, four surfaces of which are closed, unlike the first sidewall part 12 and the second sidewall part 13. Also, the fourth peripheral portion 16A, which includes a first surface 16-1, a second surface 16-2, and a third surface 16-3, is folded like the third peripheral portion 15A, resulting in the fourth sidewall part 16.

Figure 3:
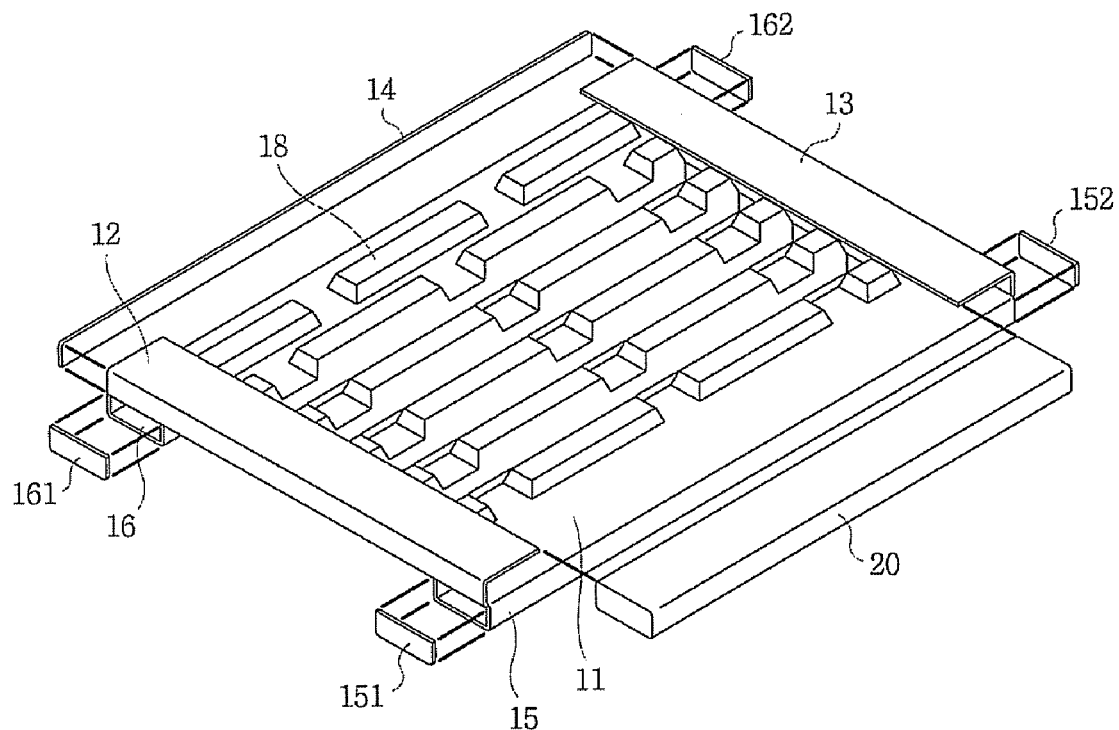
FIG. 3 is an exploded perspective view illustrating the process of assembling the central plate of FIG. 2.
Figure 4:
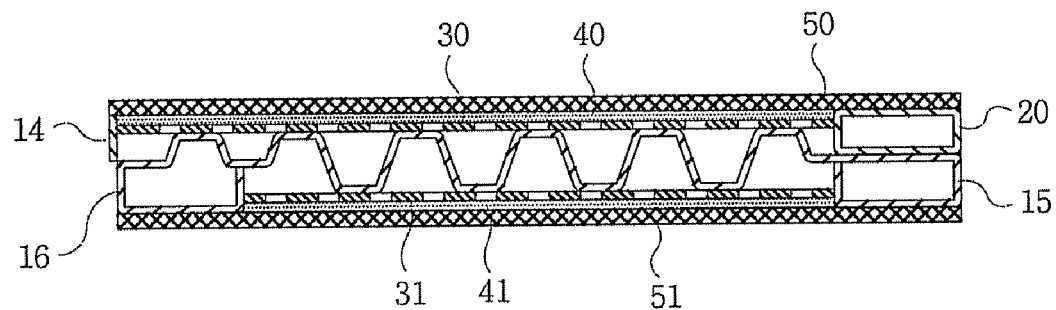
FIG. 4 is a sectional view taken along the line A-A of the unit cell plate of FIG. 1.

After the sidewall parts are formed by folding the peripheral portions as seen in FIG. 5, the portions of the first sidewall part 12 and the second sidewall part 13 are closed, as in FIG. 3. That is, as illustrated in FIG. 3, a first end plate 14 is attached to, among both ends of each of the first sidewall part 12 and the second sidewall part 13, the ends thereof on the fourth sidewall part 16. Further, among both ends of each of the first sidewall part 12 and the second sidewall part 13, the ends thereof on the third sidewall part 15 are maintained in the open state in order to function as the inlet of fuel gas. To this end, the fifth sidewall part 20 is mounted to the margin of the center plate 11 on the third sidewall part 15 so that the fifth sidewall part 20 is positioned between the first sidewall part 12 and the second sidewall part 13. Accordingly, when seen from the upper surface of the third sidewall part 15, as in FIG. 1, a fuel gas inlet 121 is defined by the surfaces constituting the first sidewall part 12 and the side surface of the fifth sidewall part 20, and a fuel gas outlet 131 is defined by the surfaces constituting the second sidewall part 13 and the side surface of the fifth sidewall part 20. Furthermore, as seen in FIGS. 1 and 4, an anode collector plate 30, an anode 40, and a first electrolyte matrix 50 are sequentially placed on the center plate in the direction (represented by "UP" in FIG. 5) surrounded by the first sidewall part 12, the second sidewall part 13, the first end plate 14 and the fifth sidewall part 20, thus forming the anode part. In this way, as seen in FIG. 4, a cathode collector plate 31, a cathode 41 and a second electrolyte matrix 51, in that order, are placed beneath the center plate 11 in the direction (represented by "DOWN" in FIG. 5) in which the third sidewall part 15 and the fourth sidewall part 16 are formed, leading to the cathode part.

As in FIG. 1, a fuel gas which is supplied via the fuel gas inlet 121 (represented by "IN") of the first sidewall part 12 is passed through the channel part defined by the guide protrusions 18 and the guide grooves 19 and then flows toward the fuel gas outlet 131 (represented by "OUT") of the second sidewall part 13, so that the direction of the gas flow is changed to 180°. Such gas flow functions to cause the temperature distribution of the separator plate, heated by heat generated during the operation of the fuel cell, to be uniform. In addition, the fifth sidewall part 20 functions to support the collector plate of the anode part provided on the plate, along with the first sidewall part 12 and the second sidewall part 13. The fifth sidewall part 20 may also be mounted through welding, as in the first end plate 14. Thus, while the fuel gas, guided into the fuel gas inlet 121, is brought into contact with the surface of the center plate 11 having the guide protrusions 18 and the guide grooves 19, it is reformed by heat generated during the operation of the fuel cell and by the catalyst applied on the center plate 11 to thus be converted into hydrogen and carbon dioxide. The hydrogen and carbon dioxide thus converted are oxidized in the anode 40, and oxygen or air is supplied to the cathode 41 to thus produce carbonate ions, which are then transferred via the electrolyte matrix disposed between the anode 40 and the cathode 41. As such, electrons flow via an external circuit. In particular, the reforming reaction may occur in such a manner that the fuel gas is subjected to a primary reforming reaction in a manifold (not shown in the interest of simplification of the drawing) connected to the inlet of the anode 40 and then to a secondary reforming reaction in the region of the center plate 11, corresponding to the anode part.

The third peripheral portion 15A and the fourth peripheral portion 16A, which are opposite each other, have three folding lines and thus are folded three times. Accordingly, as seen in FIG. 3, the third sidewall part 15 and the fourth sidewall part 16 have four surfaces which are longitudinally extended to form the shape of a closed square section. Thereby, a gas, that is, an oxidizing gas, can flow between the third sidewall part 15 and the fourth sidewall part 16, which are opposite each other. The third sidewall part 15 and the fourth sidewall part 16 are formed beneath the surface of the plate, opposite the surface on which the first sidewall part 12 and the second sidewall part 13 are formed. The oxidizing gas flows from the inlet thereof to the side opposite the inlet via the channel part defined by the guide protrusions 18 and the guide grooves 19. That is, as represented by the arrow in FIG. 1, the oxidizing gas flows from the direction of the first sidewall part 12 (represented by "in") to the direction of the second sidewall part 13 (represented by "out"), while hydrogen ions (H$^+$) transferred from the anode 40 are reduced in the cathode 41.

Both open ends of each of the third sidewall part 15 and the fourth sidewall part 16 may be closed using a seal plate. That is, both open ends of the third sidewall part 15 are closed by attaching a second seal plate 151 and a third seal plate 152 thereto, and both open ends of the fourth sidewall part 16 are closed by attaching a fourth seal plate 161 and a fifth seal plate 162 thereto. Thereby, the oxidizing gas can flow uniformly in one direction. The second seal plate 151, the third seal plate 152, the fourth seal plate 161, and the fifth seal plate 162 may be attached through welding upon the manufacture of the separator plate. The third sidewall part 15 and the fourth sidewall part 16 function to support the collector plate of the cathode part.

The respective peripheral portions 12A, 13A, 15A, 16A constituting the first sidewall part 12, the second sidewall part 13, the third sidewall part 15 and the fourth sidewall part 16 are subjected to corrosion resistant coating using any one corrosion resistant material selected from among aluminum, nickel-aluminum and aluminum-titanium, thus increasing corrosion resistance. Such corrosion resistant coating is preferably performed using a known process, such as screen printing, and thus the coating layer may be formed to a predetermined thickness ranging from 10 to 100 µm, depending on the vertical distance between the screen and the sidewall part.

In particular, the flow of fuel gas between the first sidewall part 12 and the second sidewall part 13 and the flow of oxidizing gas between the third sidewall part 15 and the fourth sidewall part 16 result in co-flow in the same direction, therefore increasing the performance of the stack and the durability and lifetime of the separator plate.

After the completion of the manufacture of the separator plate as described above, as illustrated in FIGS. 1 and 4, in the anode part, an anode collector plate 30 is positioned on the first sidewall part 12, the second sidewall part 13 and the fifth sidewall part 20, the anode 40 is positioned on the anode collector plate 30, and the first electrolyte matrix 50 is positioned on the anode 40. The anode collector plate 30 is composed of a plurality of holes 32. Through the holes 32, the fuel gas is brought into contact with the anode. Further, in the cathode part, the cathode collector plate 31 is positioned beneath the third sidewall part 15 and the fourth sidewall part 16, the cathode 41 is positioned beneath the cathode collector plate 31, and the second electrolyte matrix 51 is positioned beneath the cathode 41, thereby completing a single unit cell plate 10. Two or more cell plates may be laminated depending on the required capacity to thus form a single module. In the unit cell plates 10, a region between a separator plate and another separator plate positioned thereon or therebeneath constitutes a cell. That is, the anode part and the cathode part positioned on and beneath the electrolyte matrix function as an anode and a cathode, respectively, thus forming a unit cell. Due to the electrochemical reaction of the fuel gas supplied into the anode part and the oxidizing gas supplied into the cathode part, chemical energy is converted into electrical energy.

Furthermore, a guide vane is attached to a fuel gas distributor 12 of the anode part so that fuel gas having a uniform flow rate is supplied into the central portion of the separator plate. Also, a supply pipe (a supply pipe in the manifold) for supplying a fuel gas may be connected to the fuel gas inlet 121 and the fuel gas outlet 131 through welding, and a manifold for supplying an oxidizing gas may be connected to the cathode part through welding, which will be easily understood by those skilled in the art. The gas supply pipe is connected to a first external reformer using a flange. In this case, to provide electrical insulation, the flange should be formed of alumina ceramic.

In particular, the central portion of the anode part of the separator plate is subjected to corrosion resistant coating in order to increase corrosion resistance, and catalyst particles are loaded or applied thereon. Thereby, in the case where the fuel gas supplied into the fuel cell comprises not hydrogen gas but natural gas or coal gas, it is directly reformed into hydrogen and carbon dioxide, which are then immediately used for generation of electricity.

Figure 6:
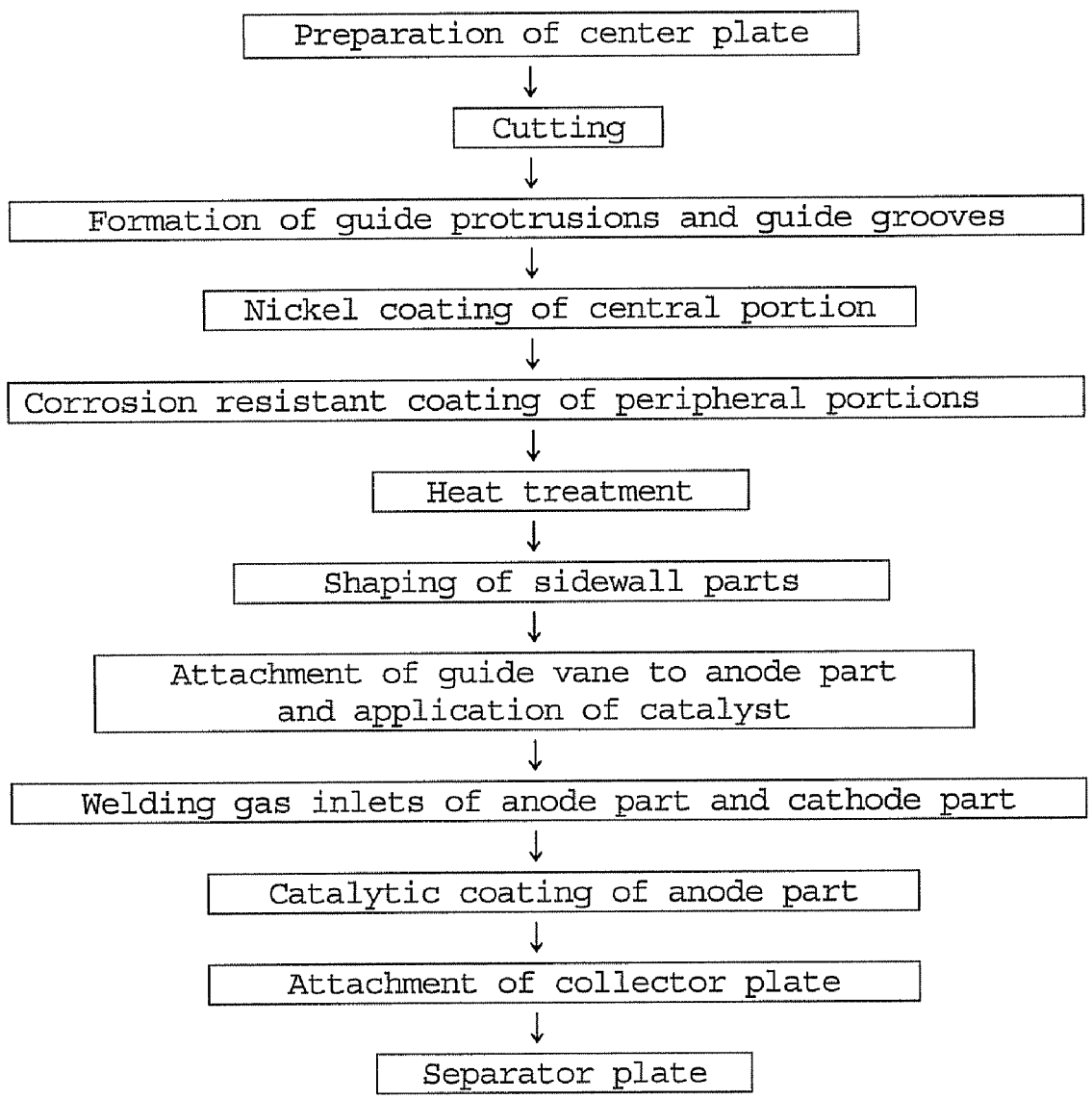
FIG. 6 is a flowchart sequentially illustrating the process of manufacturing the separator plate for an MCFC according to a first embodiment of the present invention.

As illustrated in FIG. 6, the method of manufacturing the separator plate for an MCFC of the present invention comprises (1) a preparation step of cutting a center plate 11 to have a central portion and four peripheral portions therearound; (2) a channel formation step of forming guide protrusions 18 and guide grooves 19 on the central portion of the center plate 11; (3) a coating step of subjecting the central portion having the channels to nickel coating and the peripheral portions to corrosion resistant coating; (4) a shaping step of folding the peripheral portions to thus form sidewall parts; and (5) a welding step of welding supply pipes for supplying gases to an anode part and a cathode part formed by the sidewall parts. That is, according to the present invention, a center plate 11 is manufactured into the separator plate through processing and folding in such a manner that the center plate 11 is cut to have one central portion and four peripheral portions therearound, and the guide protrusions 18 and the guide grooves 19 are formed on the central portion of the center plate 11, thus defining the channels, after which the peripheral portions are folded to thus form the sidewall parts. In this way, the separator plate, which functions to reform the fuel gas while allowing it to efficiently flow therein and thereout and which functions to realize the electrical connection between the anode 40 and the cathode 41, can be simply manufactured. Therefore, the number of constituents required to manufacture the separator plate is decreased, and thus, the welding process is performed the smallest number of times, therefore making it possible to produce a highly reliable separator plate having high corrosion resistance.

After the coating step, a heat treatment step for heating the coating layer to stabilize it may be further performed.

Figure 7:
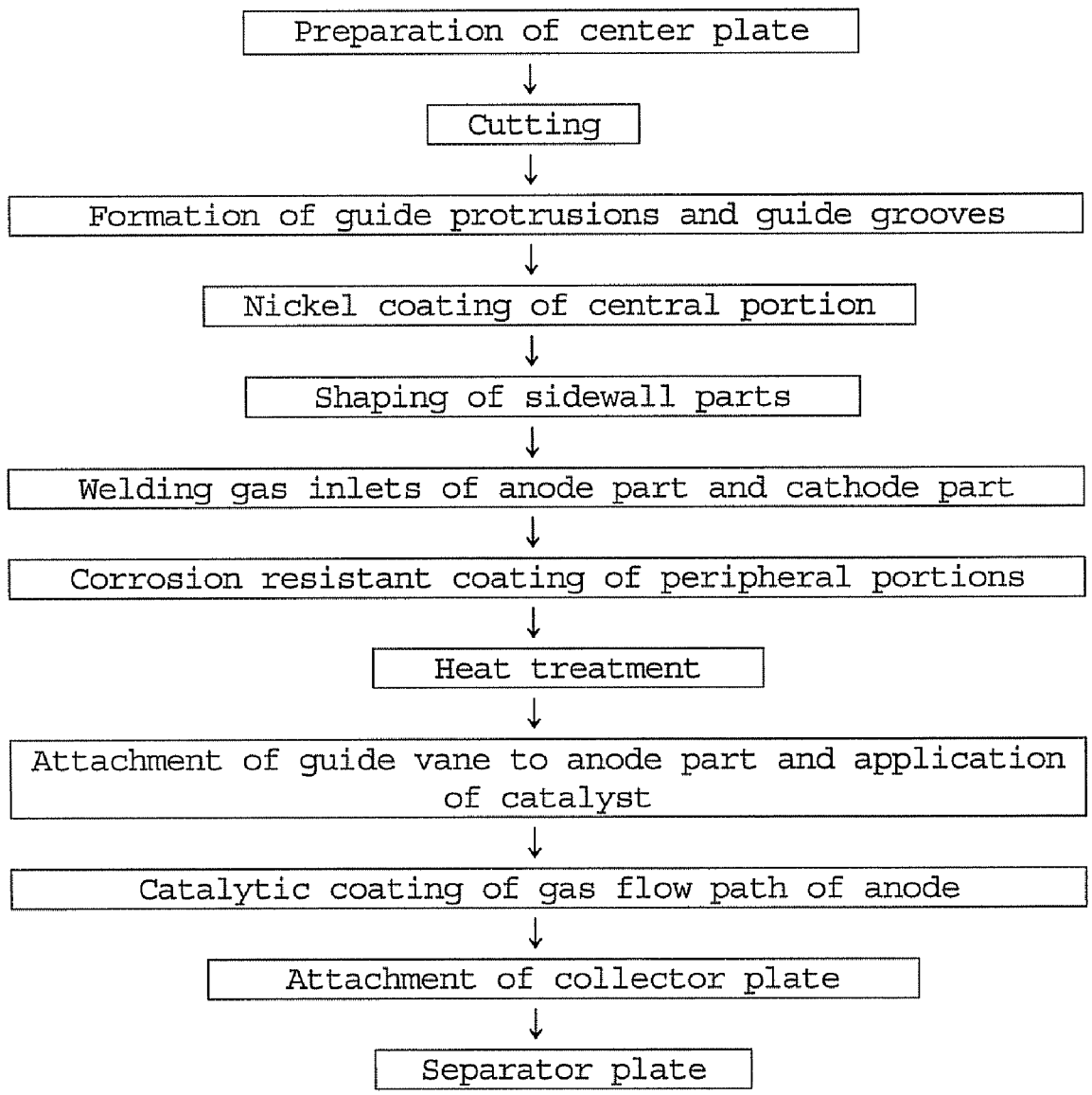
FIG. 7 is a flowchart sequentially illustrating the process of manufacturing the separator plate for an MCFC according to a second embodiment of the present invention.

Alternatively, as illustrated in FIG. 7, the sequence for manufacturing the separator plate may be changed, which has no influence on the manufacture of the separator plate. According to the above process, the separator plate may be efficiently manufactured, which will be readily understood by those skilled in the art.

The separator plate for an MCFC having the above structure may be formed by processing a metal plate and attaching seal plates and seal bodies to the unfolded portions thereof using a welding process. Consequently, it is possible to simply manufacture the separator plate, which functions to reform the fuel gas while allowing it to efficiently flow therein and thereout and which functions to realize the electrical connection between the anode 40 and the cathode 41.

As described hereinbefore, the present invention provides a separator plate for an MCFC and a manufacturing method thereof. According to the present invention, the separator plate functions to directly reform a fuel gas therein to thus supply the reformed gas into an anode 40. Using a reforming reaction, which is an endothermic reaction, the internal temperature of the fuel cell can be controlled, and thereby the temperature distribution in the fuel cell can be uniformly controlled, therefore minimizing the thermal stress region, resulting in a prolonged fuel cell lifetime. Further, since a single center plate 11 is formed into a separator plate through a folding process, high productivity results. As well, the separator plate can be efficiently manufactured using a folding process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A separator plate for a molten carbonate fuel cell, the separator plate comprising:
   a center plate comprising a corrosion resistant metal plate, which includes a channel part comprising a corrugated structure having guide protrusions and guide grooves on both surfaces thereof;
   a first sidewall part and a second sidewall part, each of which is integrated with the center plate in such a manner that a first peripheral portion of the first sidewall part and a second peripheral portion of the second sidewall part, which are disposed at opposite edges of the channel part, are integrated with the center plate, are disposed opposite to each other, and have a rectangular bar shape having one surface open toward the central portion of the center plate;
   a third sidewall part and a fourth sidewall part, each of which is integrated with the center plate and comprise a third peripheral portion and a fourth peripheral portion, respectively, are integrated with the center plate, are disposed opposite to each other, and are both disposed on a side of the center plate which is opposite to a side on which the first sidewall part and the second sidewall part are disposed, wherein a first seal plate and a second seal plate are disposed on opposite ends of the third sidewall part and a third seal plate and a fourth seal plate are disposed on opposite ends of the fourth sidewall part;
   a first end plate disposed on corresponding ends of the first sidewall part and the second sidewall part, the corresponding ends being disposed on the fourth sidewall part; and
   a fifth sidewall part mounted to a margin of the center plate on the third sidewall part and between the first sidewall part and the second sidewall part, wherein the fifth sidewall part has a rectangular bar shape, an end of the fifth sidewall part and the first sidewall part define a portion of an inlet, an opposite end of the fifth sidewall part and the second sidewall part define a portion of an outlet, a second seal plate and a third seal plate are attached to both open ends of the third sidewall part, and a fourth seal plate and a fifth seal plate are attached to both open ends of the fourth sidewall part.

2. The separator plate of claim 1, wherein the guide protrusions and the guide grooves comprise a continuously corrugated structure which distributes gas flow paths over an entire area of the separator plate.

3. A separator plate comprising:
   a center plate including channel part comprising a corrugated structure, a first side and an opposite second side;
   a first sidewall part disposed on the first side of the center plate, the first sidewall part comprising a first surface of the first sidewall part and an adjacent second surface of the first sidewall part, wherein the first surface of the first sidewall part is normal to the second surface of the first sidewall part, and the second surface of the first sidewall part defines at least a portion of an opening disposed towards a central portion of the center plate;
   a second sidewall part disposed on the first side of the center plate, the second sidewall part comprising a first surface of the second sidewall part and an adjacent second surface of the second sidewall part, wherein the first surface of the second sidewall part is normal to the second surface of the second sidewall part, the second surface of the second sidewall part defines at least a portion of an opening disposed towards a central portion of the center plate, and the second sidewall part is disposed at an end of the center plate which is opposite to an end at which the first sidewall part is disposed;
   a third sidewall part and fourth sidewall part disposed on the second side of the center plate, wherein the third sidewall part is disposed at an end of the center plate which is opposite to an end at which the fourth sidewall part is disposed, wherein the third sidewall part and the fourth sidewall part are perpendicular to the first sidewall part and the second sidewall part, and wherein each end of the third sidewall part and the fourth sidewall part further comprises a seal plate, which seals the each end;
   a fifth sidewall part disposed on the first side of the center plate and on the third sidewall part, wherein the fifth sidewall part has a rectangular bar shape, and is interposed between the first sidewall part and the second sidewall part;
   an inlet, a portion of which is defined by the first surface of the first sidewall part, the second surface of the first sidewall part, and an end of the fifth sidewall part; and an outlet, a portion of which is defined the first surface of the second sidewall part, the second surface of the second sidewall part, and an opposite end of the fifth sidewall part.

4. The separator plate of claim 3, wherein the third sidewall part and the fourth sidewall part each have a rectangular bar shape.

5. The separator plate of claim 4, wherein the third sidewall part and the fourth sidewall part each further comprise a first surface disposed normal to the center plate, a second surface disposed parallel to the center plate, and a third surface disposed normal to the center plate.

6. The separator plate of claim 3, wherein the center plate, the first sidewall part, and the second sidewall part are a unitary indivisible part.

7. The separator plate of claim 3, wherein the center plate, the third sidewall part, and the fourth sidewall part are a unitary indivisible part.

8. The separator plate of claim 3, wherein the center plate, the first sidewall part, the second sidewall part, the third sidewall part, and the fourth sidewall part are a unitary indivisible part.

9. A fuel cell comprising the separator plate of claim 3.

10. A reactor comprising the separator plate of claim 3.

11. The reactor of claim 10, wherein the reactor is a fuel cell.

* * * * *